United States Patent [19]

Nishihara et al.

[11] Patent Number: 4,897,862
[45] Date of Patent: Jan. 30, 1990

[54] ACOUSTIC ALARM DETECTION SYSTEM FOR TELEPHONE ACTIVATION

[75] Inventors: Kaneyuki Nishihara, Abiko; Akinobu Tomimori, Kashiwa, both of Japan; Philip H. Rittmueller, St. Charles, Ill.

[73] Assignee: NEC Corporation, Tokyo, Japan

[21] Appl. No.: 199,481

[22] Filed: May 27, 1988

[51] Int. Cl.$^4$ .................. H04M 11/04; G08B 3/10
[52] U.S. Cl. ................................ 379/40; 379/41; 340/531
[58] Field of Search ................ 379/39–43, 379/102, 105; 340/531, 540

[56] References Cited

U.S. PATENT DOCUMENTS

| | | | |
|---|---|---|---|
| 4,189,720 | 2/1980 | Lott | 340/531 |
| 4,191,947 | 3/1980 | Bouchard et al. | 340/531 |
| 4,417,235 | 11/1983 | Del Grande | 340/531 |
| 4,520,349 | 5/1985 | Varano | 340/531 |
| 4,520,503 | 5/1985 | Kirst et al. | 381/56 |
| 4,558,181 | 12/1985 | Blanchard et al. | 379/42 X |
| 4,570,155 | 2/1986 | Skarman et al. | 340/531 |
| 4,612,535 | 9/1986 | Sequin et al. | 340/531 X |
| 4,617,555 | 10/1986 | Sheiman | 340/531 |

FOREIGN PATENT DOCUMENTS

| | | | |
|---|---|---|---|
| 52-51896 | 4/1977 | Japan | 340/531 |
| 59-225661 | 12/1984 | Japan | 379/105 |
| 59-225662 | 12/1984 | Japan | 379/105 |

*Primary Examiner*—Keith E. George
*Attorney, Agent, or Firm*—Guy W. Shoup; Brian D. Ogonowsky

[57] ABSTRACT

An electronic device for generating an activation signal in response to detection of an acoustic signal having parameters within respective predetermined ranges, and then automatically dialing a prestored telephone number and transmitting a prerecorded message over the telephone line in response to the activation signal. The device includes a transducer for transducing an acoustic signal into an electrical signal; a detector for outputting an activation signal in response to detection of an acoustic signal having parameters within respective predetermined ranges; and a telephone module for automatically dialing a prestored number and transmitting a prerecorded message in response to the activation signal. The detected parameters include the amplitude of the acoustic signal, the frequency of the acoustic signal, the duration of each burst of the acoustic signal, and the duration of each interval between successive bursts of the acoustic signal.

4 Claims, 5 Drawing Sheets

ACOUSTIC ALARM DETECTION SYSTEM FOR TELEPHONE ACTIVATION

FIELD OF THE INVENTION

This invention relates to systems which monitor a remote location and activate a telephone alarm message in response to detection of a predetermined condition. In particular, it relates to a system which detects the presence of a predetermined alarm signal at the remote location.

BACKGROUND OF THE INVENTION

Many devices are known in the prior art for monitoring a remote location and generating an alarm signal at the remote location in response to detection of a predetermined condition.

For example, U.S. Pat. No. 4,668,941 discloses a method and apparatus for discriminating sounds due to the breakage of glass and then triggering an alarm system. The sound of breaking glass comprises a low frequency or thump sound at the moment of breakage, followed by a tinkle sound caused by collision of the glass fragments, this sound being of lower amplitude. The apparatus disclosed in U.S. Pat. No. 4,668,941 relies on the discovery that irrespective of the size and shape of the glass and the characteristics of the surroundings, the thump sound has substantial low frequency components and the tinkle sound has substantial high frequency components. The method lies in identifying the high and low frequency components in that order and separated by a short time interval.

The apparatus disclosed in U.S. Pat. No. 4,668,941 comprises a microphone feeding into a high frequency and a low frequency channel. The low frequency channel comprises a low frequency bandpass filter followed by an amplifier and a voltage comparator, which provides an output voltage when the amplitude of the signal from the bandpass filter and amplifier exceeds a preset threshold value. The signal from the comparator is applied to a monostable multivibrator, which triggers a timer after a predetermined delay. The timer produces a signal of predetermined duration, thereby establishing a time window which enables an AND gate. The signal from the microphone is also applied to a high frequency channel comprising a high frequency bandpass filter and a voltage comparator, the output of which is applied to the other input of the AND gate.

Thus in accordance with U.S. Pat. No. 4,668,941, the AND gate outputs an alarm trigger signal in response to the detection of a predetermined high frequency signal having an amplitude above a predetermined threshold within a predetermined time after detection of a predetermined low frequency signal having an amplitude above another predetermined threshold.

A similar system for detecting glass breakage is disclosed in U.S. Pat. No. 4,134,109. This system utilizes transducers to convert acoustic waves received into electrical signals then analyzes the signal strength (amplitude), frequency content and the pattern of the signal and signal intervals to discriminate the sound of glass breakage from background or spurious noise.

The foregoing prior art relating to systems for detecting glass breakage suffer from the disadvantage that the rate of false alarms is inherently high. In the first place, because the frequencies of the thump and tinkle sounds of glass breakage will vary over a wide range for different types of glass of different dimensions, the bandpass filters of the detection system must have a wide passband. The wider the passband, the greater the likelihood that the background or spurious noise will include a frequency component within that passband. Thus, because more background or spurious noise will be detected, the probability of noise signals which mimick the sound of glass breakage within the range of the passband is correspondingly high.

Secondly, such detection systems are designed to detect a single sequence of events, that is, the thump sound followed within a predetermined time interval by a tinkle sound. If the background or spurious noise mimicks the sounds of this single sequence of events, then a false alarm will be triggered. Common sense dictates that the greater the number of events in the sequence which must be detected before an alarm signal is triggered, the lower the risk that a false alarm will be triggered.

Thirdly, although the foregoing systems detect the duration of an interval between two signals falling within a predetermined frequency passband, they do not detect the duration of the signals themselves. This again increases the probability of a false alarm because the signals being detected are not limited as to duration. The probability that the background or spurious noise will include a signal of first frequency followed by a signal of second frequency within a predetermined time interval is far greater than the probability that the background or spurious noise will include a signal of first frequency and first duration followed by a signal of second frequency and second duration within a predetermined time interval. In other words, if more characteristics of the received signal are detected, then more spurious signals which lack any one of those characteristics can be filtered out, thereby reducing the probability that a false alarm will be triggered.

Another material prior art reference is U.S. Pat. No. 4,558,181, which discloses a portable, self-contained device for monitoring a selected local area for the occurrence of any one of a plurality of preselected conditions. The monitoring device can be attached to any telephone jack. The standard telephone receiver set is then plugged into the monitoring device. After connection to an electrical outlet, the monitoring device is ready for operation by internal circuits which allow the monitoring device to create complex messages which are sent over the telephone lines in response to any one of a plurality of predetermined alarm conditions.

In particular, the device includes a monitoring device having an alarm condition responsive to a non-connected sound alarm such as a smoke detector or a burglar alarm, which alarm operates adjacent the monitoring device for a predetermined time duration indicative of an alarm condition. The detailed circuitry for providing a telephone alarm signal in response to sound recognition of local alarm signal is shown in FIGS. 5 and 13 of U.S. Pat. No. 4,558,181. A more general depiction of this detection circuitry is shown in FIG. 1 herein.

As shown in FIG. 1, the system for detecting a smoke alarm in accordance with U.S. Pat. No. 4,558,181 comprises a microphone 2 for transducing received acoustic signals into electrical signals. The signal output from the microphone 2 is amplified by amplifier 4. When switch 6 is closed in response to a control signal from the microprocessor (not shown), the amplified signal is applied to the high pass filter 8, which is used to charge capacitor 10 which contains a charge representing the average level voltage detectable by the analog value on output line 12. The analog value of the voltage on line 12 is periodically read by an analog-to-digital converter (not shown). If this value exceeds a certain level, it is indicative of a detection or alarm condition. The existence of the alarm condition selects a particular word or phrase from a voice processor (not shown), which message is sent over the telephone line. The detection system disclosed in U.S. Pat. No. 4,558,181 operates on the principle of detecting whether the filtered ambient acoustic signal exceeds a predetermined amplitude threshold for a preselected duration. Thus, it suffers from the second and third disadvantages of the prior art relating to glass breakage detection already discussed above. Since this detection system responds to a single occurrence of a signal having a frequency within a predetermined range and an amplitude in excess of a predetermined threshold, the risk that a spurious signal falling within this class of signals is greater than would be the case if the parameters of the recognized signal were more narrowly defined.

SUMMARY OF THE INVENTION

One object of the invention is to overcome the foregoing disadvantages of the above-discussed prior art.

It is another object of the invention to provide a system for detecting an acoustic signal comprising a periodic pattern of pulse trains of predetermined frequency and predetermined duration.

In particular, the object of the invention is to provide a system for activating a telephone call in response to detection of a local alarm signal with reduced risk of false detection.

It is a further object of the invention to provide a system for automatically dialing a telephone number and then playing a prerecorded message in response to detection of an alarm condition in a local area.

It is a further object of the invention to provide electronic circuitry which reliably and accurately recognizes a distinctive sound by detecting the frequency, amplitude and duration of that sound.

It is yet another object of the invention to provide a system for recognizing a distinctive sound which can be incorporated in a telephone.

Another object of the invention is to provide a system for automatically sending an alarm message by telephone in response to detection of an alarm signal produced by a conventional alarm device such as a smoke detector.

It is a further object of the invention to provide a system for automatically sending an alarm message by telephone in response to detection of an alarm signal which is inexpensive to manufacture and implement and which requires no additional wiring.

It is a further object of the invention to provide electronic circuitry which outputs a count signal in response to each recognition of a distinctive sound and outputs an activation signal after a predetermined count has been reached.

Another object of the invention to provide a system for automatically dialing different telephone numbers and sending different alarm messages in dependence on which one of a plurality of possible alarm signals has been detected.

Furthermore, it is an object of the invention to provide a low-cost system for preventing loss of life and property which is easy to implement.

Finally it is an object of the invention to provide a system for automatically sending an alarm message by telephone in response to an alarm condition which need not be hard-wired to a central controller.

The foregoing objects are realized in accordance with the invention by a sound recognition system which outputs an activation signal in response to a predetermined number of detections of an acoustic signal having an amplitude, frequency and duration in predetermined ranges. The activation signal in turn activates the automatic dialing of a predetermined telephone number followed by the transmission of a prerecorded message over the telephone line.

The sound recognition systems includes the following elements connected in series: means for transducing an acoustic signal into an electrical signal, preamplifying means for preamplifying the electrical signal, means for amplifying the electrical signal with a variable gain, high pass filter means for removing signal components having a frequency less than a predetermined lower threshold frequency, low pass filter means for removing signal components having a frequency greater than a predetermined upper threshold frequency, means for performing half-wave rectification of the amplified and filtered signal, means for producing square wave pulses having a pulse length and a pulse interval corresponding to the respective trains of half-wave rectified pulses output by the half-wave rectifying means, means for outputting an increment counter signal in response to detection of a pulse having a duration in a first predetermined range, and counting means for incrementing a count by unity in response to detection of each increment counter signal and outputting an activation signal in response to the detection of increment counter signals during a predetermined number of successive regular intervals, said count being restarted if the duration of the pulse interval between the falling edge of one pulse and the leading edge of the next pulse falls outside a second predetermined range. This activation signal serves to activate the automatic dialing of a predetermined telephone number and the transmission of a prerecorded message over the telephone line.

BRIEF DESCRIPTION OF THE DRAWINGS

The preferred embodiments of the invention will be described in detail with reference to the drawings, wherein.

DETAILED DESCRIPTION OF THE PREFERRED EMBODIMENTS

In accordance with the preferred embodiments of the invention, the acoustic signal being detected is an alarm signal of a conventional smoke detector. However it is understood that the principle of the invention can be applied to detect any acoustic alarm signal of the form shown in FIG. 2, for example, which is produced by an alarm system in response to detection of a natural gas leak, freezer malfunction, intrusion into an automobile or building, and water leakage or back-up.

Figure 1:
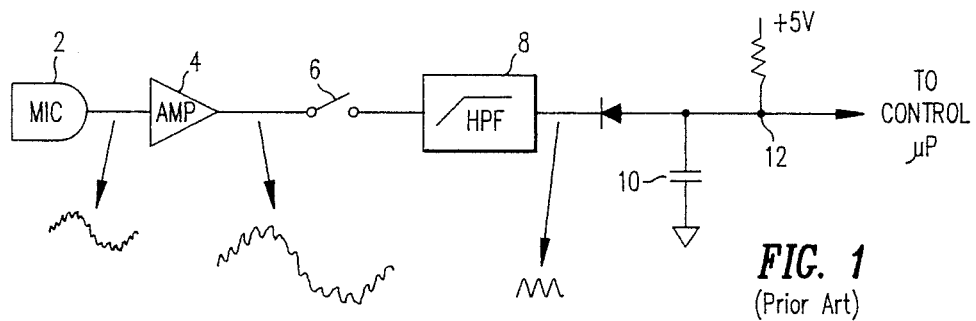
FIG. 1 is a diagram depicting the circuitry of a conventional device for producing an activation signal in response to the detection of an alarm signal having an amplitude greater than a predetermined threshold amplitude output by a smoke detector.
Figure 2:
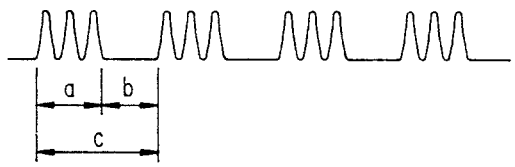
FIG. 2 is a diagram showing the parameters of a predetermined acoustic signal produced by a conventional smoke detector which are detected in accordance with the invention.

The acoustic signal shown in FIG. 2 has a repetitive pattern of acoustic bursts of predetermined duration and separated by a predetermined interval, each acoustic burst having the same predetermined frequency. Many conventional smoke detectors produce acoustic alarm signals of the form shown in FIG. 2, including those listed in the following table:

| Model | Frequency (Hz) | Duration (msec) | Interval (msec) |
|---|---|---|---|
| SA67D | 3333 | 130 | 75 |
| 10905 | 3226 | 190 | 85 |
| SD100A | 3125 | 160 | 70 |
| FG888D | 2500 | 120 | 76 |
| SMK6D/M1 | 2631 | 105 | 18 |

In what follows, preferred embodiments will be disclosed which is designed to detect an acoustic signal which has a burst duration a in the range of 92 to 190 msec and an interval b between bursts in the range of 21 to 92 msec. Referring again to the above table, it can be seen that the preferred embodiments would generate an activation signal in response to an acoustic alarm signal generated by any one of the listed conventional models.

Alternatively, it is understood that in order to design a system for use with only a specific one of the conventional systems, the detecting circuitry need simply be adjusted to detect frequency and duration in a narrower range and centered on the frequency and duration of that specific conventional system. This alternative would have the advantage of narrowing the window of detection and thereby reducing the probability of false detection due to background or spurious noise.

Figure 3:
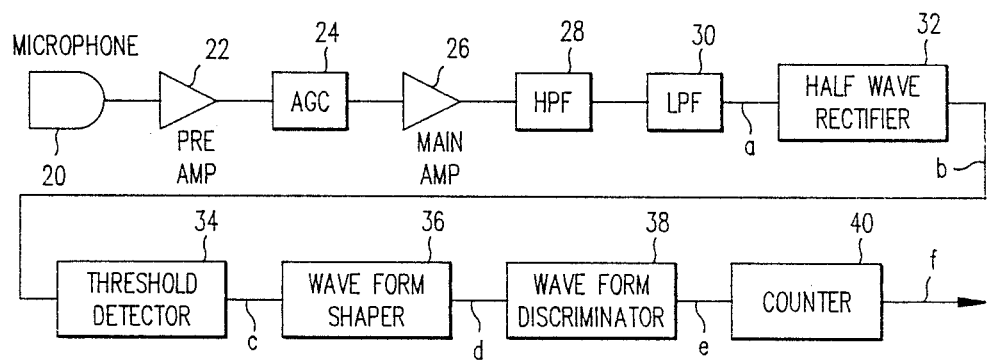
FIG. 3 is a block diagram showing the circuitry in accordance with a preferred embodiment of the invention.

The block diagram of the circuitry in accordance with the first preferred embodiment of the invention is depicted in FIG. 3. The acoustic alarm signal generated by the smoke detector or other alarm system is transduced into electrical signals by a conventional microphone 20. This electrical signal is then amplified by a circuit comprising a preamplifier 22, an automatic gain controller 24 and a main amplifier 26 which are connected in series.

The amplified signal is then applied to the input of a high pass filter 28 which filters out those components of the amplified signal which have a frequency lower than a predetermined lower threshold frequency. The high pass filtered signal is then applied to the input of a low pass filter 30 which filters out those components of the high pass filtered signal which have a frequency greater than a predetermined upper threshold frequency.

Figure 4:
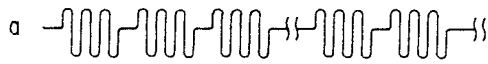
FIG. 4 is a timing diagram showing the signals appearing at corresponding outputs of the circuitry depicted in FIG. 3.
Figure 4:
Figure 4:
Figure 4:
Figure 4:
Figure 4:
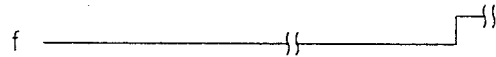

The result is a signal output from the low pass filter 30 which has only frequency components within a predetermined passband defined by the aforementioned upper and lower threshold frequencies. If the only signal with that frequency passband which the microphone detected was a signal of the form shown in FIG. 2, then the form of the signal a output by the low pass filter will be as shown in FIG. 4a. In particular, the low pass filter outputs a signal comprising a train of bursts of an alternating waveform, each burst having a predetermined duration corresponding to the duration of the acoustic signal and successive bursts being separated by a predetermined interval corresponding to the interval between acoustic bursts.

The train of bursts of an alternating waveform are then input to a half-wave rectifier 32, which outputs a corresponding train b of bursts of a half-wave rectified waveform as depicted in FIG. 4b.

The train b is then applied to a circuit comprising a threshold detector 34 and a waveform shaper 36 connected in series. The respective signals output by the threshold detector and the waveform shaper are shown in FIGS. 4c and 4d. The signal d output by the waveform shaper 36 is a train of square pulses, each square pulse having a length corresponding to the time during which the acoustic signal transduced by the microphone exceeds a predetermined sound level and successive square pulses being separated by an interval having a length corresponding to the time during which the acoustic signal transduced by the microphone falls below that predetermined sound level.

The train d of square pulses is then input to a waveform discrimination circuit 38, which outputs a count signal in response to each discrimination of a square wave pulse having a length within a first predetermined range immediately followed by an interval between the trailing edge of that pulse and the leading edge of the next successive pulse having a length within a second predetermined range.

These count signals e (see FIG. 4e) are output to a counter circuit 40, which counts the number of count signals received at successive regular intervals and outputs an activation signal f (see FIG. 4f) in response to the count becoming equal to a predetermined number, e.g., eight.

This activation signal indicates that a predetermined number, e.g., eight, of cycles of the acoustic alarm signal generated by the smoke detector in the local area have been detected. In response to this activation signal, a telephone module (not shown) automatically dials a prestored telephone number and then transmits an appropriate prerecorded message, for example, a message informing the party being telephoned of the existence of the alarm condition at the local area. Naturally such a message would identify the type of alarm condition and the address of the local area. The telephone module may also be programmed to call a plurality of prestored telephone numbers in a predetermined sequence in response to the activation signal.

Thus, in accordance with this preferred embodiment of the invention a local area can be continuously monitored for the occurrence of a specific acoustic signal. This specific acoustic signal, for example, the alarm signal of a conventional smoke detector, can be discriminated in the presence of background or spurious noise.

In a further refinement of this preferred embodiment, different channels can be provided in parallel for continuously monitoring the occurrence of any one of a plurality of specific acoustic signals. Each channel generates a respective activation signal in response to detection of the corresponding specific acoustic signal. In accordance with such a multi-channel embodiment, the telephone module will automatically dial a prestored telephone number in dependence on which channel has generated an activation signal. For example, three channels could be provided for respectively detecting a smoke detector alarm signal, a burglar alarm signal and a panic alarm signal, in response to which the telephone module would be programmed to respectively call the local fire department, the local police department and the local emergency medical service.

In accordance with a second preferred embodiment of the invention, the waveform discrimination circuit outputs a reset counter signal whenever an edge of the train of square wave pulses from the wave shaper occurs which is inconsistent with the predetermined acoustic signal being detected. It will be recalled that in the first preferred embodiment, the waveform discrimination circuit outputs a count (i.e., increment counter) signal whenever a square wave pulse and the subsequent interval between that pulse and the next square wave pulse are consistent with the predetermined acoustic signal being detected. Therefore in accordance with the second preferred embodiment of the invention, the counter is reset in response to each reset counter signal from the waveform discrimination circuit. In both embodiments, the counter generates an activation signal in response to reaching a predetermined count representing predetermined number of successive cycles of square wave pulses consistent with the predetermined acoustic signal being detected.

Figure 5A:
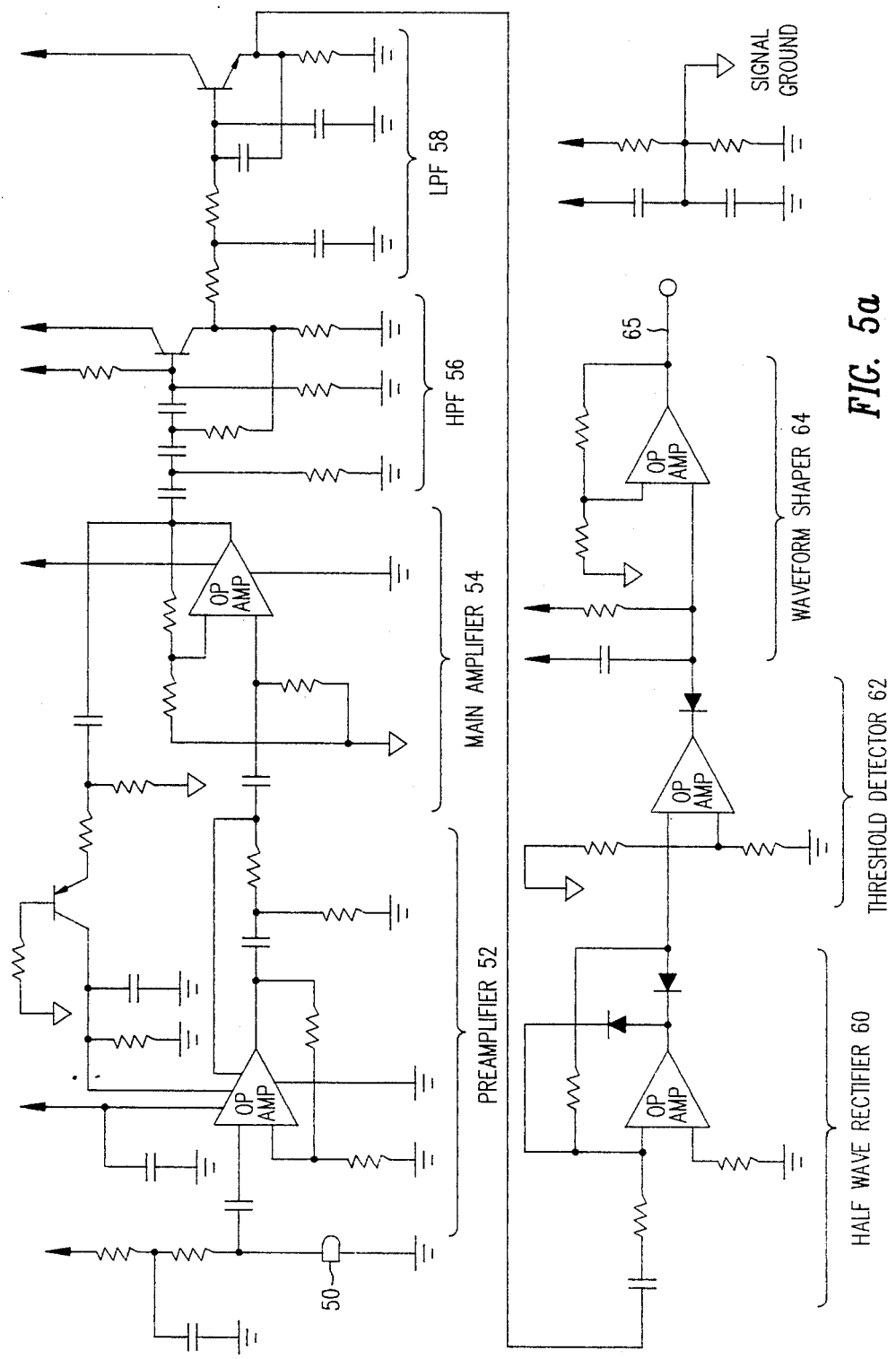
FIG. 5a is a detailed circuit diagram of the amplifying, filtering, rectifying and shaping circuitry in accordance with a second preferred embodiment of the invention.
Figure 5B:
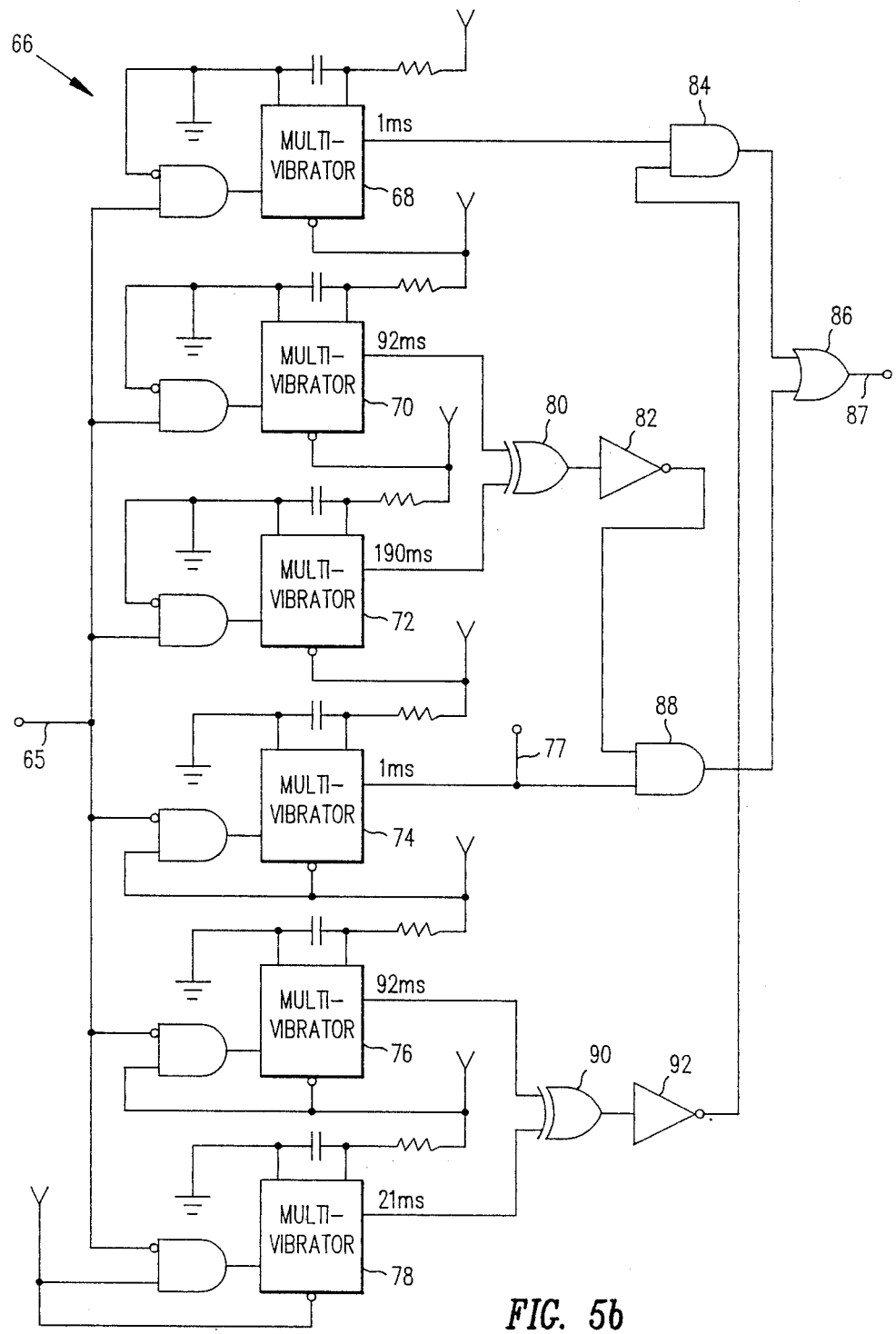
FIG. 5b is a detailed circuit diagram of the waveform discrimination circuitry in accordance with the second preferred embodiment of the invention.
Figure 5C:
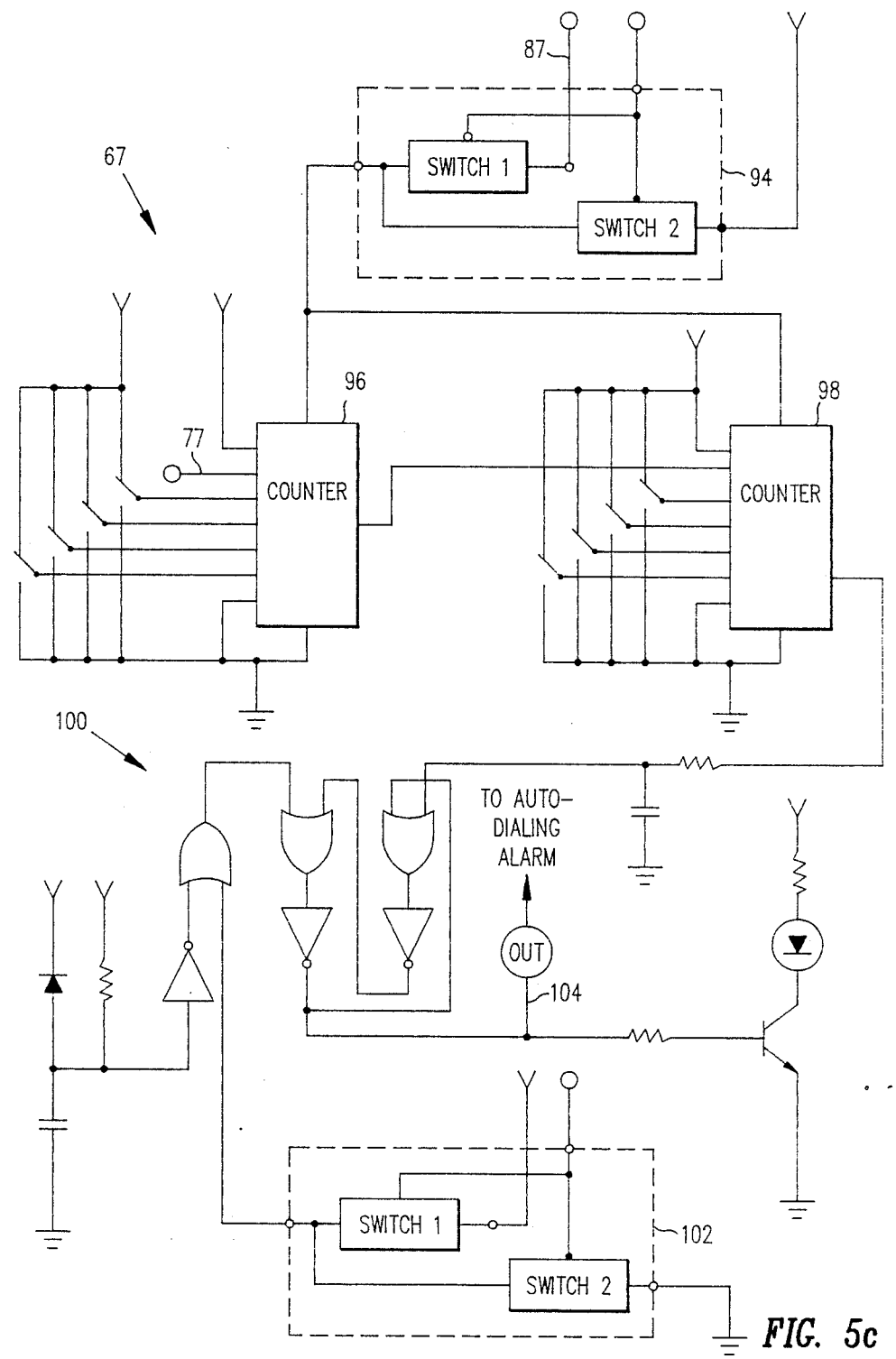
FIG. 5c is a detailed circuit diagram of the counting circuitry in accordance with the second preferred embodiment of the invention.

The detailed circuitry for this second preferred embodiment of the invention is shown in FIGS. 5a–5c. FIG. 5a shows the analog portion of the circuitry in accordance with the second preferred embodiment which comprises the series connection of the microphone 50, preamplifier 52, main amplifier 54, high pass filter 56, low pass filter 58, half-wave rectifier 60, threshold detector 62 and waveform shaper 64. All of these elements perform the same functions as the corresponding elements described in connection with the first embodiment shown in FIG. 3.

Figure 6:
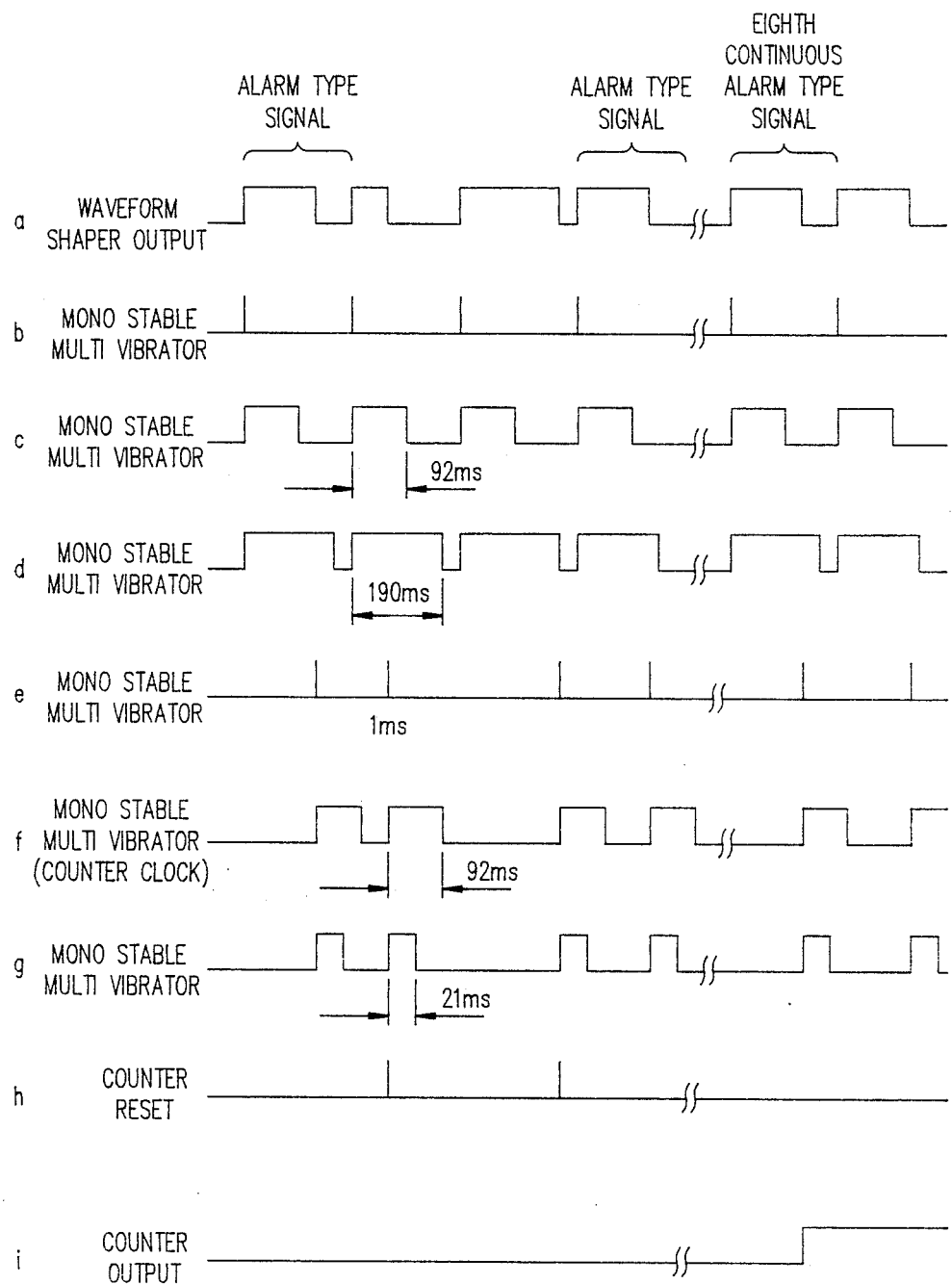
FIG. 6 is a timing diagram showing the signals appearing at corresponding outputs of the monostable multivibrators of the waveform discrimination circuitry, the reset signals input into the counting circuitry in dependence on the monostable multivibrator outputs, and the activation signal output by the counting circuitry in accordance with the second preferred embodiment of the invention.

In particular, the waveform shaper 64 comprises a smoothing circuit and a high-gain operational amplifier which serves as a comparator. The output 65 of the waveform shaper 64 is a train of square wave pulses which is input to the digital circuitry depicted in FIGS. 5b and 5c. An example of a waveform shaper output signal is shown in FIG. 6a.

The digital circuitry shown in FIG. 5b constitutes the waveform discrimination circuit 66, which serves the function of outputting a reset counter signal in response to each occurrence of a square wave pulse having a duration outside of a first predetermined range and in response to each occurrence of an interval between successive square pulses having a duration which is outside a second predetermined range. As will become clear hereinafter, the first predetermined range is 92 to 190 msec and the second predetermined range is 21 to 92 msec. Obviously these ranges can be adjusted as necessary depending on the parameters of the acoustic alarm signal generated by the smoke detector in conjunction with which the alarm detection device of the invention is being used.

The waveform discrimination circuit 66 comprises an array of monostable multivibrators 68, 70, 72, 74, 76, and 78 connected in parallel to receive the output 65 from the waveform shaper 64. Monostable multivibrators 68, 70, 72 respond to the leading edges of the square wave pulses output by wave shaper 64; monostable multivibrators 74, 76, 78 respond to the trailing edges of the square wave pulses output by wave shaper 64. In particular, monostable multivibrators 68, 70, 72 respectively output square wave pulses having a duration of 1, 92 and 190 msec in response to each leading edge (see FIGS. 6b–6d) and wave pulses having a duration of 1, 92 and 21 msec in response square to each trailing edge (see FIGS. 6e–6g).

The outputs of monostable multivibrators 70 and 72 are respectively applied to the inputs of a EXOR gate 80. The output of EXOR gate 80 is in turn inverted by invertor 82. The output of invertor 82 and the output of monostable multivibrator 74 are respectively applied to the inputs of an AND gate 88. Similarly, the outputs of monostable multivibrators 76 and 78 are respectively applied to the inputs of a EXOR gate 90. The output of EXOR gate 90 is in turn inverted by invertor 92. The output of invertor 92 and the output of monostable multivibrator 68 are respectively applied to the inputs of an AND gate 84. The outputs of AND gates 84 and 88 are respectively applied to the inputs of an OR gate 86.

The logic circuitry of the waveform discrimination circuit 66 performs the function of outputting a reset counter pulse in response to each occurrence of a square wave pulse having a duration outside of the range of 92 to 190 msec and in response to each occurrence of an interval between successive square pulses having a duration which is outside the range of 21 to 92 msec. The output 87 of OR gate 86 is applied to the counting circuitry shown in FIG. 5c. This output 87 is the reset counter signal depicted in FIG. 6h.

The counting circuitry 67 depicted in FIG. 5c comprises a first RCA CD 4053 analog multiplexer 94, a first counter 96, a second counter 98, and logic circuitry 100 connected in series. A second RCA CD 4053 analog multiplexer 102 is also connected to the logic circuitry 100. The basic principle of the operation of the counting circuitry 67 is as follows.

The counting circuitry 67 receives the signal output by monostable multivibrator 74 via line 77. This monostable multivibrator outputs a 1-msec pulse in response to each trailing edge of the waveform shaper output. The counting circuitry increments a count by unity in response to each increment counter pulse received from monostable multivibrator 74. In addition, the counting circuitry 67 receives reset counter pulses on line 87 from the waveform discrimination circuit 66. In response to each reset counter pulse, the count stored in the counting circuitry is reset, i.e., restarted. When the count in the counting circuitry reaches a predetermined value, e.g., eight, an activation signal is output on line 104. This activation signal is depicted in FIG. 6i.

As the foregoing makes clear, an activation signal will be output by the counting circuitry only if a predetermined number of increment counter pulses are received by the counting circuitry 67 without a reset counter pulse being received. This activation signal is then used to activate the automatic dialing and transmission of a prerecorded message as previously described.

Thus all acoustic signals which cause square wave pulses to be received by the waveform discrimination circuit which have a duration outside the 92-190 msec range and an interval outside the 21-92 msec range will cause the count to be reset, thereby preventing activation of the automatic dialing and message transmission. If the acoustic signals being detected cause square wave pulses having a duration within the 92-190 msec range and an interval within the 21-92 msec range, then the count will not be reset, thereby activating the automatic dialing and message transmission in accordance with the invention. The acoustic alarm signals of conventional smoke detectors are in the latter category.

The foregoing preferred embodiments have been described for illustrative purposes only. Other modifications within the scope of the appended claims would be apparent to a practitioner having ordinary skill in the art to which the invention pertains. For example, it would be obvious to one of ordinary skill in the ar of digital circuit design that portions of the hard-wired digital circuitry disclosed herein could be replaced by a suitably programmed, functionally equivalent microprocessor.

What is claimed is:

1. An electronic device for generating an activation signal in response to detection of an acoustic signal having parameters within predetermined ranges, comprising:
    converting means for producing square wave pulses having durations which correspond to durations of bursts of an acoustic signal having a frequency within a predetermined passband;
    detection means coupled to said converting means for outputting a reset counter signal in response to each detection of a pulse having a duration outside of a first predetermined range a in response to each detection of a pulse interval between successive pulses having a duration outside of a second predetermined range, and outputting an increment counter signal in response to each detection of a trailing edge of a pulse; and
    counting means for incrementing a count by unity in response to each detection of an increment counter signal and outputting an activation signal in response to a detection of a predetermined number of successive increment counter signals, said count being restarted in response to each detection of a reset counter signal.

2. An electronic device for generating an activation signal in response to detection of an acoustic signal having parameters within predetermined ranges, comprising:
    means for transducing an acoustic signal into an electrical signal;
    preamplifying means coupled to said transducing means for preamplifying the electrical signal;
    means coupled to said preamplifying means for amplifying the preamplified electrical signal with a variable gain;
    high pass filter means coupled to said amplifying means for removing signal components having a frequency less than a predetermined lower threshold frequency;
    low pass filter means coupled to said high pass filter means for removing signal components having a frequency greater than a predetermined upper threshold frequency;
    rectifying means coupled to said low pass filter means for performing half-wave rectification of an amplified and filtered signal outputted by said low pass filter means;
    converting means coupled to said rectifying means for producing a square wave pulse train having pulse lengths and intervals between pulses corresponding to bursts and burst intervals outputted by said half-wave rectifying means;
    detection means coupled to said converting means for outputting a reset counter signal in response to each detection of a pulse having a duration outside of a first predetermined range and in response to each detection of a pulse interval between successive pulses having a duration outside of a second predetermined range, and outputting an increment counter signal in response to each detection of a trailing edge of a pulse; and
    counting means for incrementing a count by unity in response to each detection of an increment counter signal and outputting an activation signal in response to a detection of a predetermined number of successive crement counter signals, said count being restarted in response to each detection of a reset counter signal.

3. The electric device as defined in claim 2, wherein said detection means comprises a plurality of monostable multivibrators connected in parallel and logic circuitry for outputting said reset counter signal.

4. An electronic device for generating an activation signal in response to detection of an acoustic signal having parameters, including burst durations and intervals between bursts, within predetermined ranges, comprising;
    means for transducing an acoustic signal into an electrical signal; and
    means for outputting an activation signal in response to detection of a predetermined number of bursts of an acoustic signal having said parameters within said respective predetermined ranges, said activation signal for coupling to a means for automatically dialing a prestored number and transmitting a prerecorded message in response to said activation signal,
    wherein said parameters comprise the amplitude of said acoustic signal, the frequency of said acoustic signal, the duration of each burst of said acoustic signal, and the duration of each interval between successive bursts of said acoustic signal.

* * * * *